US007663786B2

(12) United States Patent
Kim et al.

(10) Patent No.: US 7,663,786 B2
(45) Date of Patent: Feb. 16, 2010

(54) IMAGE-FORMING APPARATUS AND METHOD OF CONTROLLING OPERATIONS IN AUTOMATIC DOCUMENT FEEDER MODE THEREOF

(75) Inventors: Seok-ho Kim, Yongin-si (KR); Koo-won Park, Suwon-si (KR); Jin-sik Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 897 days.

(21) Appl. No.: 10/933,313

(22) Filed: Sep. 3, 2004

(65) Prior Publication Data

US 2005/0068592 A1 Mar. 31, 2005

(30) Foreign Application Priority Data

Sep. 29, 2003 (KR) .............................. 2003-67270
Jan. 27, 2004 (KR) ..................... 10-2004-0005132

(51) Int. Cl.
*H04N 1/04* (2006.01)
*H04N 1/38* (2006.01)
*H04N 1/40* (2006.01)

(52) U.S. Cl. ....................... 358/496; 358/498; 358/461; 358/463; 358/464; 358/412; 358/444; 358/497; 358/453; 358/474

(58) Field of Classification Search ................. 358/498, 358/474, 471, 400, 496, 461, 463, 464, 444, 358/453, 412, 497; 367/66, 38, 37, 14; 341/155, 341/126; 968/170, 139; 348/365; 355/80, 355/81; 700/135, 130, 117, 95, 90

See application file for complete search history.

(56) References Cited

U.S. PATENT DOCUMENTS 4,961,149 A * 10/1990 Schneider et al. ........... 700/135

(Continued)

FOREIGN PATENT DOCUMENTS

JP 06-311364 11/1994

(Continued)

OTHER PUBLICATIONS

Korean Official Action issued on Sep. 14, 2005, for Korean Patent Application No. 2004-5132.

*Primary Examiner*—Cheukfan Lee
(74) *Attorney, Agent, or Firm*—Stanzione & Kim LLP

(57) ABSTRACT

An image-forming apparatus having an Automatic Background Removal (ABR) function in an automatic document feeder mode and an operation control method thereof. The image-forming apparatus includes a first movement unit to move a document loaded in a document tray from a first position to a second position; a second movement unit to move a carriage containing a light source from the first position to the second position; an image processing part to process an image of the document into predetermined image data; and a control part to control the image processing part to process an image of a specific portion of the document read out by the carriage fixed at the first position and to process an entire image of the document read out by the carriage fixed at the second position in use of a predetermined contrast equalization pattern selected based on a image processing result of the specific portion. The present general inventive concept can adjust the movements of the carriage and a document to perform the Automatic Background Removal function in the automatic document feeder mode to read out the image of the document with the document moving while the light source is fixed.

30 Claims, 7 Drawing Sheets

U.S. PATENT DOCUMENTS

| | | | | | |
|---|---|---|---|---|---|
| 5,105,225 | A | * | 4/1992 | Honjo et al. | 399/206 |
| 5,579,090 | A | * | 11/1996 | Sasanuma et al. | 399/49 |
| 6,301,019 | B1 | * | 10/2001 | Saito et al. | 358/461 |
| 6,734,999 | B1 | * | 5/2004 | Nagatani | 358/498 |

FOREIGN PATENT DOCUMENTS

| | | |
|---|---|---|
| JP | 9-46523 | 2/1997 |
| JP | 09-046523 | 2/1997 |
| JP | 2001-223989 | 8/2001 |
| KR | 87014526 | 12/1987 |
| KR | 2001-0062594 | 7/2001 |

* cited by examiner

IMAGE-FORMING APPARATUS AND METHOD OF CONTROLLING OPERATIONS IN AUTOMATIC DOCUMENT FEEDER MODE THEREOF

CROSS-REFERENCE TO RELATED APPLICATIONS

This application claims the benefit of Korean Patent Application Nos. 2003-67270, filed on Sep. 29, 2003, and 2004-5132, Jan. 27, 2004, in the Korean Intellectual Property Office, the disclosures of which are incorporated herein by reference.

BACKGROUND OF THE INVENTION

1. Field of the Invention

The present general inventive concept relates to an image-forming apparatus having a function of an automatic document feeder (ADF), and more particularly, to an image-forming apparatus and an operation control method thereof capable of improving print quality with a function of automatically removing document background when in an ADF mode.

2. Description of the Related Art

An image-forming apparatus such as a digital photocopier, a multi-function peripheral (MFP) device, and the like, has a function of Auto Background Removal (ABR) or Auto Background Suppression (ABS) to improve the image quality of printed matters and save a developing agent such as toner, ink, or the like, in case of photocopying documents having certain brightness for their backgrounds rather than a white color, as provided in newspapers.

The conventional Auto Background Removal (ABR) has been available due to relatively easy movements of a carriage containing a light source when photocopying on the platen.

However, the movements of the carriage containing a light source is not easy in an automatic document feeder mode since images are read out with a document moving while the carriage containing a light source is fixed, so that the Automatic Background Removal (ABR) function can not be activated.

Accordingly, the automatic document feeder mode not only brings out a remarkably deteriorated print quality as to documents having certain brightness as in newspapers, but also unnecessarily wastes consumables.

SUMMARY OF THE INVENTION

Accordingly, it is an aspect of the present general inventive concept to provide an image-forming apparatus and an operation control method thereof enabling an Auto Background Removal (ABR) function in the automatic document feeder (ADF) mode to read out document images with documents moving while a light source is fixed.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an image-forming apparatus having an automatic document feeder (ADF) mode, comprising a first movement unit to move a document loaded in a document tray from a first position to a second position; a second movement unit to move a carriage containing a light source from the first position to the second position; an image processing part to process an image of the document into predetermined image data; and a control part to control the image processing part to process an image of a specific portion of the document read out by the carriage fixed at the first position and to process an entire image of the document read out by the carriage fixed at the second position in use of a predetermined contrast equalization pattern selected based on an image processing result of the specific portion.

The specific portion may be a certain portion corresponding to a portion from a certain distance to which the front end of the document arrives passing the first position to the second position at which the front end of the document arrives.

In detail, when the front end of the document arrives at the second position, the control part controls the first movement unit to temporarily stop the movements of the document, and controls the image processing part to process an image of the specific portion read out by the carriage at the first position and to select and apply the most suitable contrast equalization pattern to the document.

If the most suitable contrast equalization pattern is applied to the image processing part, the control part controls the second movement unit to move the carriage to the second position, and controls the first movement unit to restart the movement of the document.

The front end of the document temporarily stops at the second position, and then the front end of the document is read out by the carriage fixed at the second position, so that the image processing part processes an image in use of the most suitable contrast equalization pattern from the front end of the document.

The foregoing and/or other aspects and advantages of the present general inventive concept are also achieved by providing a method of controlling operations of an automatic document feeder mode in an image-forming apparatus, the method comprising processing an image of a specific portion of a document read out by a carriage containing a light source and fixed at a first position; selecting a suitable contrast equalization pattern based on an image processing result of the specific portion; and processing an entire image of the document read out by the carriage fixed at a second position in use of the suitable contrast equalization pattern.

The specific portion is a certain portion corresponding to a portion from a certain position at which the front end of the document arrives passing the first position to the second position at which the front end of the document arrives.

The operation of processing an image of a specific portion of a document read out by a carriage may include an operation of temporarily stopping movements of the document when the front end of the document arrives at the second position. The operation of processing an entire image of the document read out by the carriage fixed at a second position may include operations of moving the carriage to the second position if the suitable contrast equalization pattern is applied; and restarting the movements of the document whose front end arrives at the second position.

The operation of processing an entire image of the document read out by the carriage fixed at a second position processes the image of the document read out of the front end of the document by the carriage fixed at the second position in use of the suitable contrast equalization pattern.

The foregoing and/or other aspects and advantages of the present general inventive concept may also be achieved by providing an image-forming apparatus having an automatic document feeder (ADF) mode, comprising a motor to move a document loaded on a document tray in an advancing direction and a withdrawing direction; a carriage having a light source to read out an image of the document, and fixed at a predetermined position; an image processing part to process the image of the document into predetermined image data; and a control part to control the motor to move the document in the advancing direction to process an image of a specific portion of the document, and to move the document in the withdrawing direction to move a front end of the document to the position of the carriage. The control part controls the image processing part to move the document arrived at the position of the carriage in the advancing direction and process the image of the document from the front end of the document based on the image processing result.

When an image of the specific portion of the document is read-out in use of the carriage, the control part controls the image processing part to temporarily stop the advancing movement of the document, process the image of the specific portion, and select and apply the most suitable contrast equalization pattern to the document.

The foregoing and/or other aspects and advantages of the present general inventive concept may also be achieved by comprising a method of controlling operations of an automatic document feeder mode in an image-forming apparatus, the method comprising moving a document loaded on a document tray in an advancing direction to read out an image of a specific portion of the document; selecting and applying a suitable contrast equalization pattern based on the image processing result of the specific portion; moving the document in a withdrawing direction and moving a carriage having a light source to read out the image of the document to a fixed position; and moving the document in the advancing direction and processing the image from a front end of the document corresponding to the suitable contrast equalization pattern.

The operation of moving a document loaded on a document tray in an advancing direction to read out an image of a specific portion of the document may include the operation of temporarily stopping the advancing movements of the document when the image of the specific portion of the document is read out.

Accordingly, the present general inventive concept can perform the Automatic Background Removal (ABR) function even in the automatic document feeder (ADF) mode for reading out document images while documents move with the light source fixed.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE EXEMPLARY EMBODIMENTS

Figure 1:
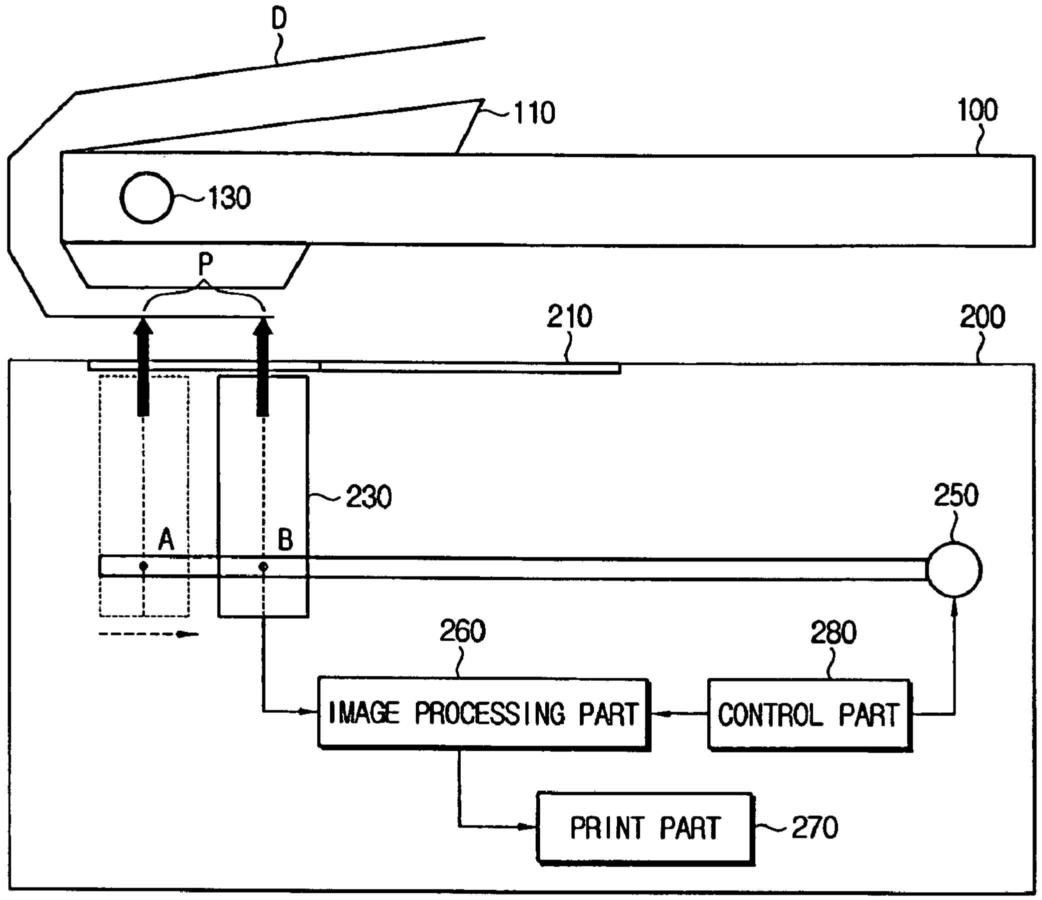
FIG. 1 is a schematic view showing an image-forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a schematic block diagram showing an image-forming apparatus according to an embodiment of the present general inventive concept. The image-forming apparatus of FIG. 1 has an automatic document feeder device 100 and a main body 200 thereof.

The automatic document feeder device 100 has a document tray 110 to load a document D and a moving unit to move the document D. The moving unit has a plurality of sensors (not shown) to sense document positions, a plurality of rollers (not shown) to move the document D into a platen 210, and a step motor 130 to drive the plurality of rollers (not shown).

Outside the main body 200 is disposed the platen 210 to read out the document D at a position opposite to the automatic document feeder device 100.

In the meantime, inside the main body 200 there can be provided a carriage 230 containing a light source (not shown) scanning the document D on the platen 210 with light to read out the image of the document D, a step motor 250 controlling the movements of the carriage 230, an image processing part 260 to process the read image of the document D into predetermined image data, a print part 270 to print and output image-processed image data, and a control part 280 to control overall operations of the image-forming apparatus.

Figure 2:
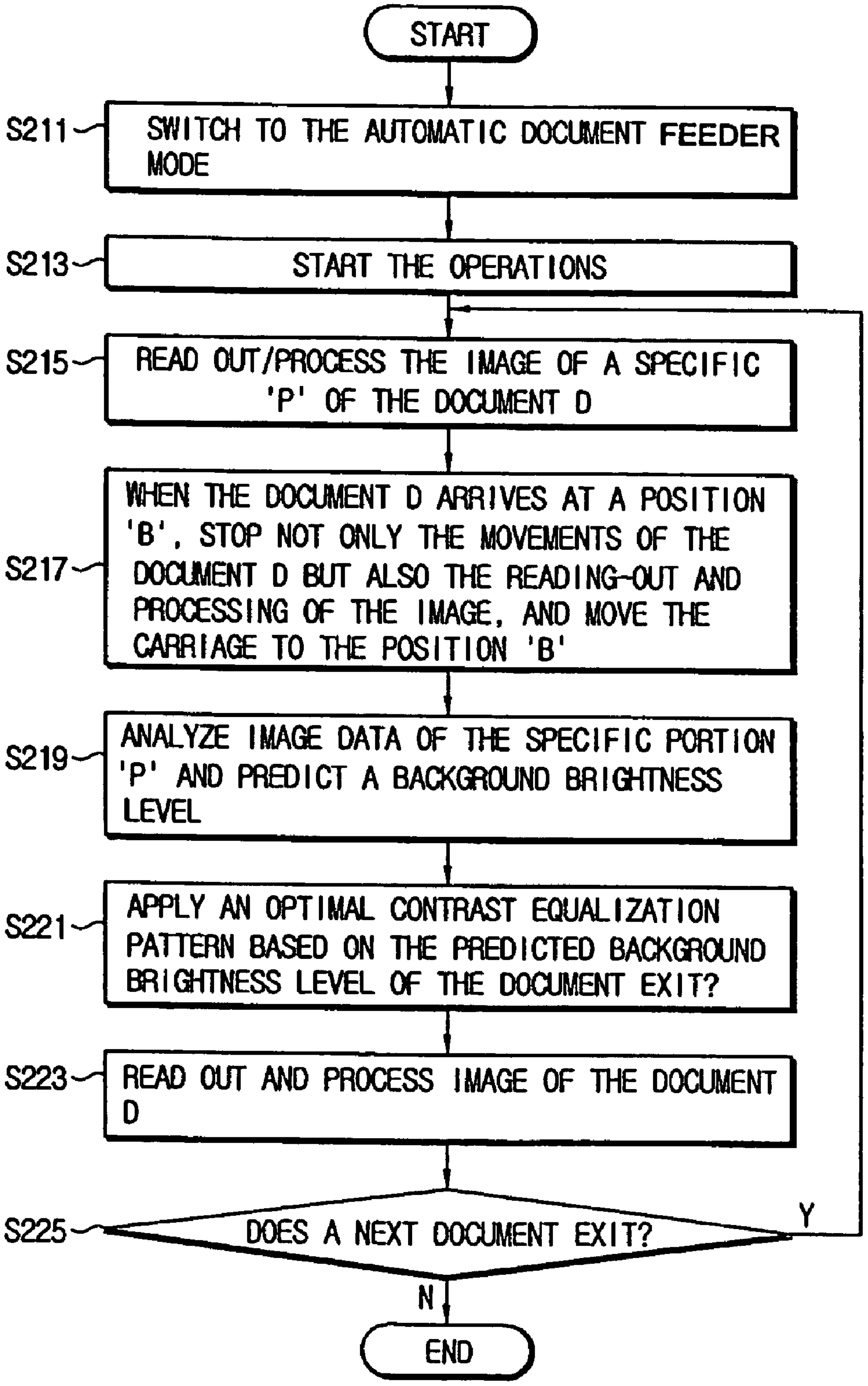
FIG. 2 is a flow chart showing a process of performing an Automatic Background Removal function in an automatic document feeder mode according to an embodiment of the present general inventive concept.
Figure 3:
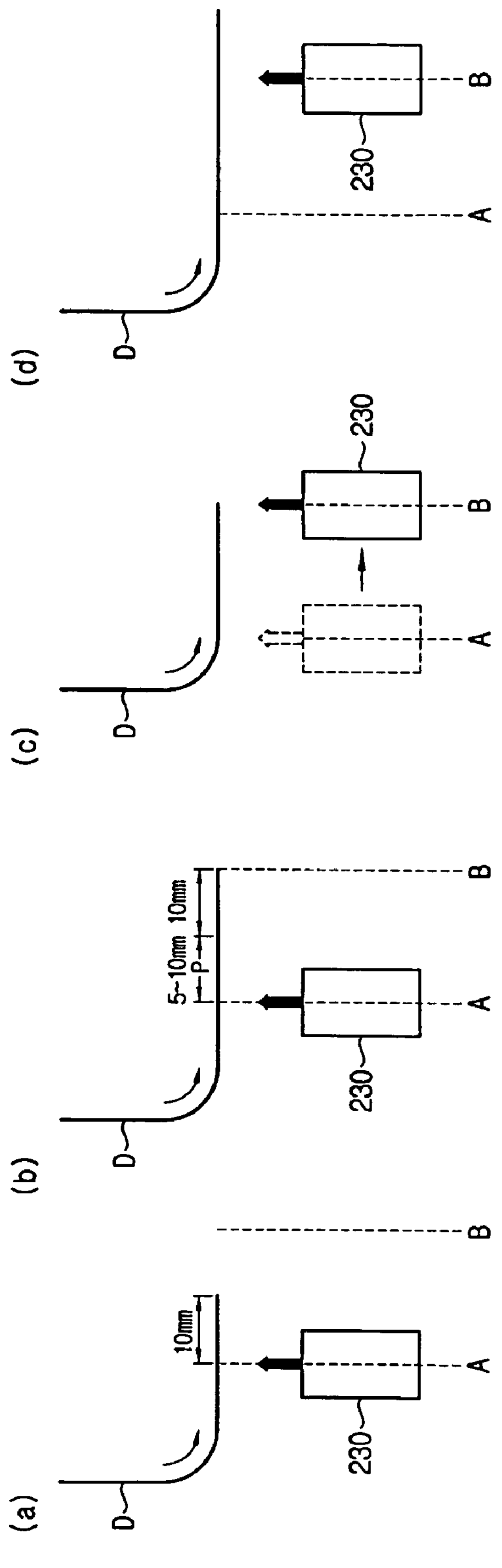
FIG. 3 is a view showing movements of a document D and a carriage 230 containing a light source in the automatic document feeder mode according to the embodiment of FIG. 1.

FIG. 2 is a flow chart showing a process of performing an Automatic Background Removal function in an automatic document feeder mode in the image-forming apparatus according to FIG. 1, and FIG. 3 is a view showing movements of the carriage 230 and the document D according to the process of FIG. 2. Hereinafter, the present general inventive concept will be described with reference to FIGS. 1 through 3.

The image-forming apparatus is switched to the automatic document feeder mode as the automatic document feeder device 100 is in close contact with the main body 200 (operation S211). At this time, the carriage 230 having the light source moves to a position ‘A’.

A user loads the document D on the document tray 110 and inputs an operation start command to initiate the automatic document supply (operation S213).

The control part 280 drives the plurality of rollers (not shown) provided in the automatic document feeder device 100 in response to the operation start command to move a front end of the document D loaded on the document tray 110 to the position ‘A’ at which the carriage 230 is fixed.

If the front end of the document D passes over the position ‘A’ by a certain distance, such as 10 mm (see (a) of FIG. 3), the control part 280 controls the light source (not shown) and the image processing part 260 to read out and process the image of the document D. As shown in (b) of FIG. 3, the operations of reading out and processing the image of the document D continues until the front end of the document D reaches a position ‘B’ (operation S215).

Thereafter, when the front end of the document D arrives at the position ‘B’, the control part 280 controls not only the step motors 130 and 250 to stop the movements of the document D, but the control part 280 also controls the reading-out and processing of the image of the document D. Furthermore, the control part 280 moves the carriage 230 to the position ‘B’, as shown in (c) of FIG. 3 (operation S217).

The movement of the document D as described above can be decided using document position information sensed by the plurality of sensors (not shown) and operation status information of the step motor 130 controlling the plurality of rollers to move the document D.

Accordingly, the reading-out and image-processing are performed with respect to an image corresponding to a specific portion ‘P’ of the document D. Here, the specific portion ‘P’ is a statistical portion on which a document background image exists, which corresponds to a margin of approximately 5 mm to 10 mm.

The control part 280 analyzes an image processing result of the specific portion ‘P’ of the document D, and predicts a background brightness level of the document D (operation S219).

Next, the control part 280 obtains an optimal contrast equalization pattern for the document D based on the predicted background brightness level of the document D, and applies the obtained pattern to the image processing part 260 (operation S221).

Thereafter, as shown in (d) of FIG. 3, the control part 280 moves the document D to read out and process the image of the document D (operation S223). That is, since the carriage 230 is fixed at the position ‘B’, the image can be read out of the front end of the document D. At this time, the read-out image of the document D is processed based on the predicted background brightness level, so that the print part 270 outputs a printed sheet of paper with the Automatic Background Removal function performed.

If plural documents D are loaded on the document tray 110, the same operations as above are repeated with respect to a next document (operation S225).

Figure 4:
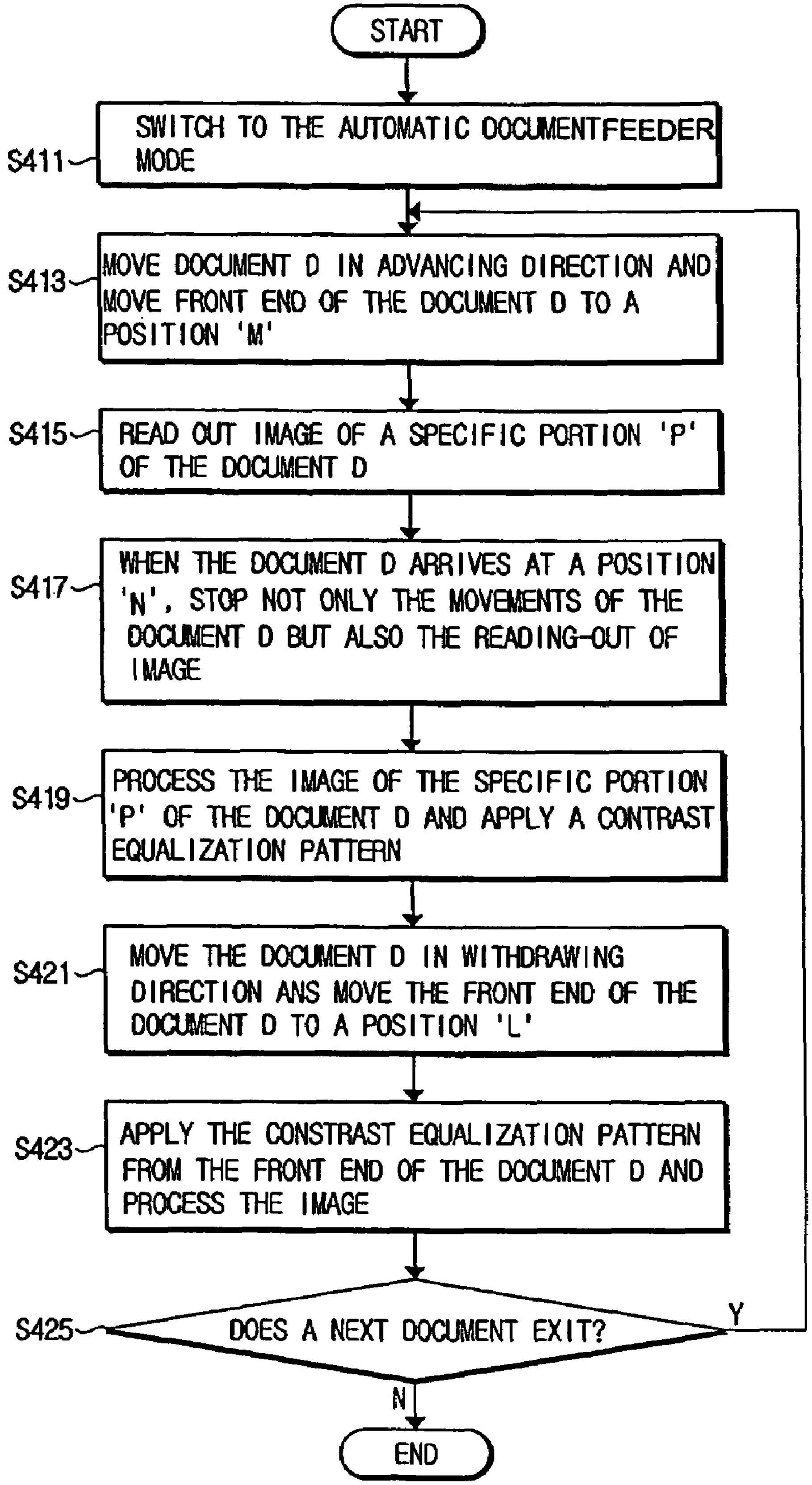
FIG. 4 is a flow chart showing a process of performing an Automatic Background Removal function in an automatic document feeder mode according to another embodiment of the present general inventive concept.
Figure 5:
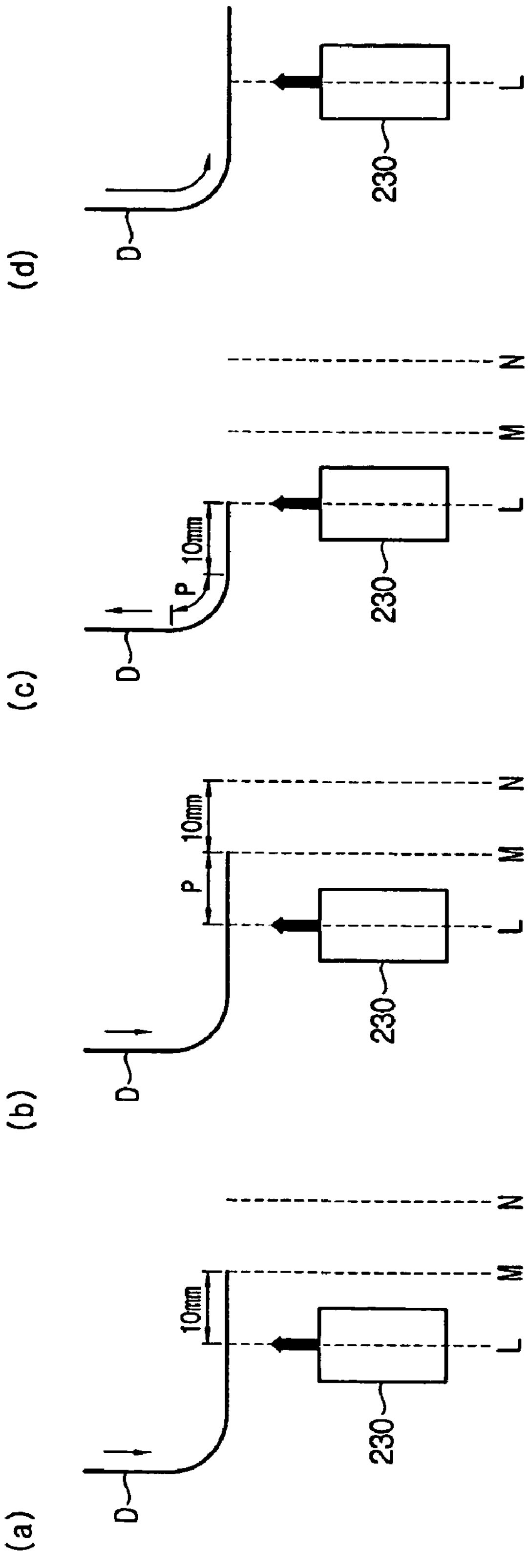
FIG. 5 is a view showing movements of a document D in the automatic document feeder mode according to the embodiment of FIG. 4.

FIG. 4 is a flow chart showing a process of performing an Automatic Background Removal function in the automatic document feeder mode in an image forming apparatus, according to another embodiment of the present general inventive concept, and FIG. 5 is a view showing movements of the carriage 230 and the document D according to the process of FIG. 4. Hereinafter, the present general inventive concept will be described with reference to FIGS. 1, 4, and 5.

The image-forming apparatus is switched to the automatic document feeder mode as the automatic document feeder device 100 is in close contact with the main body 200 (operation S411). Then, the control part 280 controls the step motor 250 to move and fix the carriage 230 at a position ‘L’.

When an operation start command is inputted, the control part 280 controls the plurality of rollers (not shown) and the step motor 130 to move the document D loaded on the document tray 110 in an advancing direction, and advances the document by a certain distance, such as 10 mm (operation S413).

When a front end of the document D arrives at a position ‘M’ (see (a) of FIG. 5), the control part 280 controls the light source (not shown) of the carriage 230 and the image processing part 260 to read out an image of a specific portion ‘P’ of the document D (operation S415). The operations of reading out and processing the image of the document D in the operation S415 are performed with respect to the specific portion ‘P’ that is sufficient to read out a background image of the document D, and continues until the front end of the document D reaches a position ‘N’ (see (b) of FIG. 5).

Thereafter, when the front end of the document D arrives at the position ‘N’, the control part 280 controls the step motor 130 and the light source of the carriage 230 to temporarily stop not only the movements of the document D, but also the reading-out of the image of the document D (operation S417).

The image processing part 260 performs an image processing with respect to the specific portion ‘P’ of the read-out document D. At this time, the control part 280 analyzes an image processing result of the specific portion ‘P’ of the document D, predicts a background brightness level of the document D, obtains a predetermined contrast equalization pattern for the document D based on the predicted background brightness level of the document D, and applies the obtained pattern to the image processing part 260 (operation S419). Here, the specific portion ‘P’ is a statistical portion on which a document background image exists, which corresponds to a margin of approximately 5 mm to 10 mm.

The control part 280 controls the step motor 130 to move the document D in a withdrawing direction until the front end of the document D arrives at the position ‘L’, at which the carriage 230 is fixed (operation S421).

Thereafter, as shown in (d) of FIG. 5, the reading-out and processing of the image are performed from the front end of the document D (operation S423). At this time, the read-out image of the document D is image-processed based on the optimal contrast equalization pattern for the predicted background brightness level, so that the print part 270 outputs a printed sheet of paper with the Automatic Background Removal function performed.

If plural documents D are loaded on the document tray 110, the same operations as above are repeated with respect to a next document (operation S425).

Accordingly, the Automatic Background Removal function is performed in the automatic document feeder mode in the same manner as in the embodiment of FIG. 3.

Figure 6:
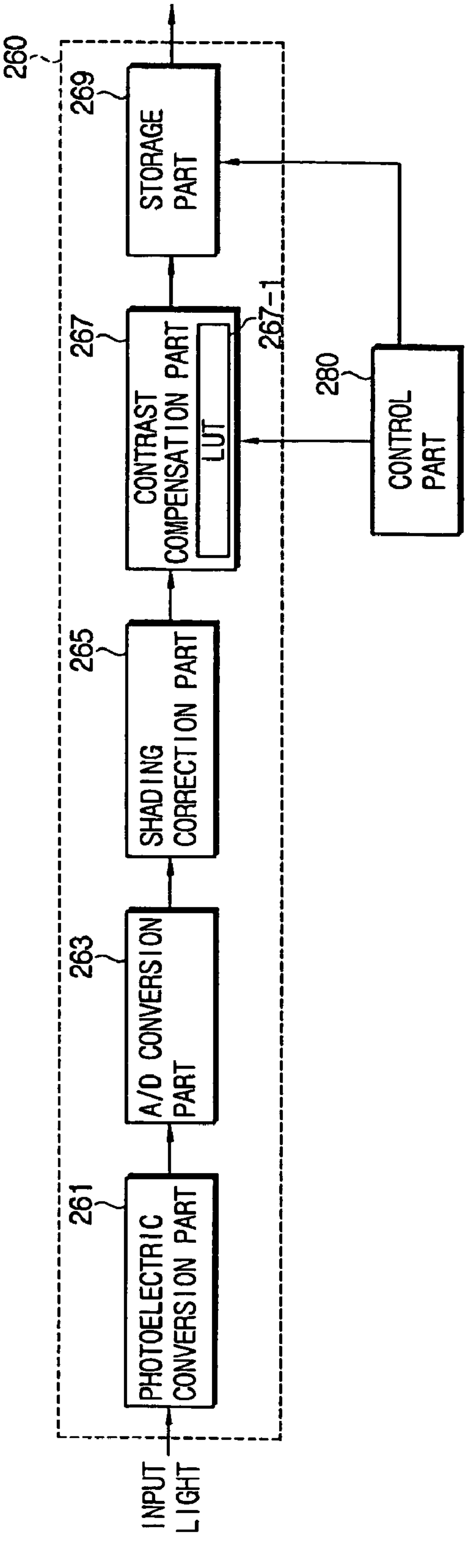
FIG. 6 is a block diagram showing in detail an image processing part of the image-forming apparatus of FIG. 1.

FIG. 6 is a block diagram showing the image processing part 260 of the image-forming apparatus of FIG. 1. Referring to FIG. 6, described in detail is an Automatic Background Removal process performed in the image processing part 260 in the automatic document feeder mode.

The image processing part 260 has a photoelectric conversion part 261, an analog/digital (A/D) conversion part 263, a shading correction part 265, a contrast compensation part 267, and a storage part 269.

The photoelectric conversion part 261 is an image sensor such as a charge-coupled device (CCD), a contact image sensor (CIS), and the like, which carries out photoelectric conversions in proportion to light reflected from a document to convert the document image into pixel patterns.

The A/D conversion part 263 performs a sampling process, a quantization process, and a coding process with respect to voltages corresponding to respective pixels outputted from the photoelectric conversion part 261 to output image data of predetermined bits per pixel.

The shading correction part 265 scans a reference pattern when the light source is turned on and off, calculates white/black shading data, and performs the white/black shading corrections by applying the calculated white/black shading data to the image data of the document D.

The contrast compensation part 267 compensates for the image data to come close to the contrast ratio of an actual document D, having a lookup table (LUT) 267-1 in which plural predetermined contrast equalization patterns are provided. Therefore, the contrast compensation part 267 adaptively selects the contrast equalization pattern according to the controls of the control part 280 to compensate for the image data of the document D.

Here, for a contrast equalization method, gamma characteristic curves are generally used each of which is a slope of a function having two axes of optical densities inputted to and outputted from a photoelectric conversion device such as CCD or CIS. That is, for the contrast equalization patterns provided in the lookup table (LUT) 267-1, gamma characteristic curves are provided in correspondence to diverse documents in addition to a normal gamma characteristic curve.

The storage part 269 stores the image data for which the shading and the contrast are compensated.

Thereafter, the stored image data is transferred to the print part 270, and printed at and outputted out of the print part 270.

Figure 7:
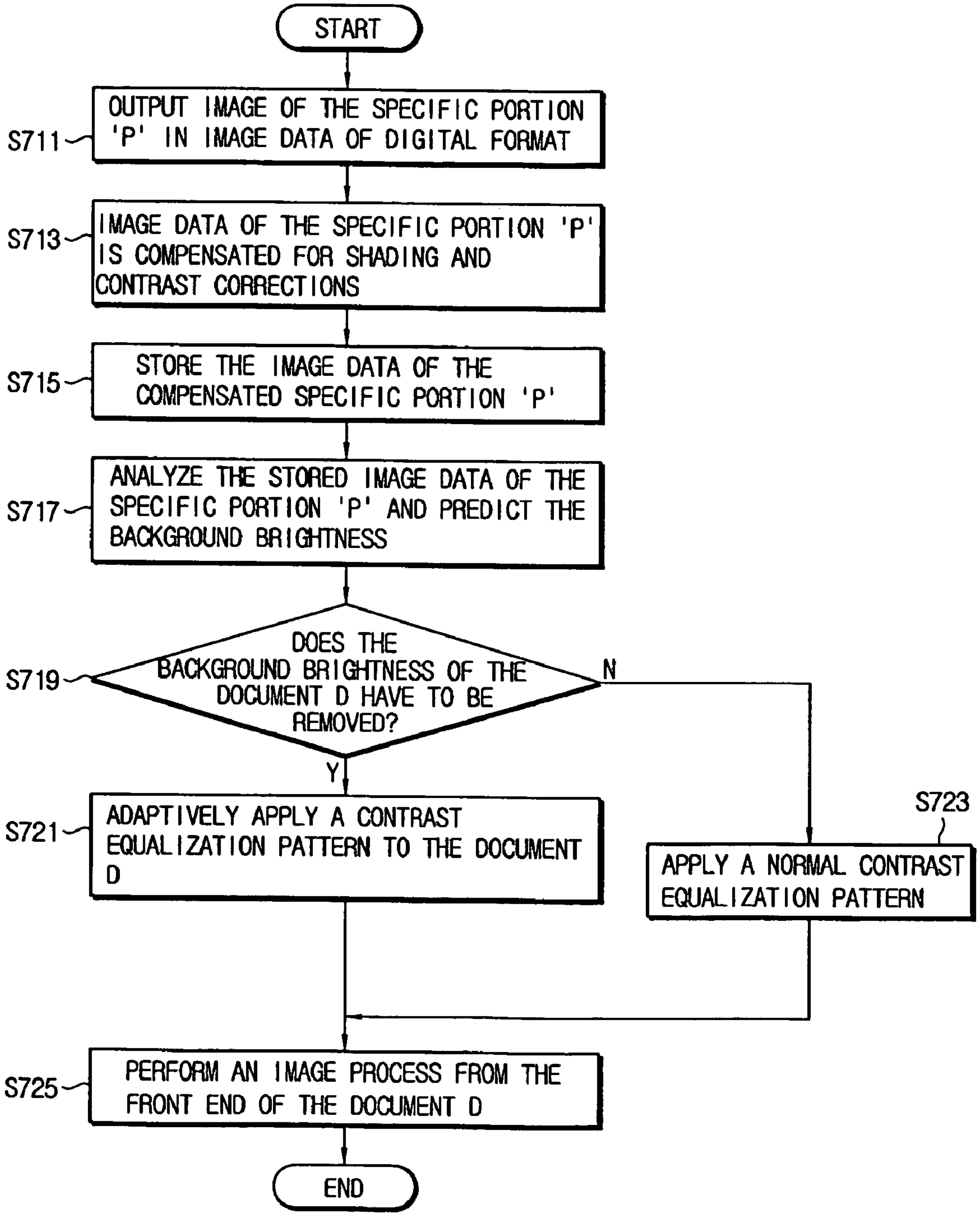
FIG. 7 is a flow chart showing an image processing procedure to perform the Automatic Background Removal (ABR) function in the automatic document feeder mode in the image processing part of FIG. 4.

FIG. 7 is a flow chart showing in detail an image data processing procedure of the operation to perform a process of improving print quality of a document in the automatic document feeder mode shown in FIG. 4, according to an embodiment of the present general inventive concept. Hereinafter, descriptions will be made on an image data processing procedure according to the present general inventive concept with reference to FIG. 6 and FIG. 7.

If the image forming apparatus of the present general inventive concept processes an image in the automatic document feeder mode with respect to the document D having a certain background brightness, the image forming apparatus controls the movements of the carriage 230 and the document D, processes the image of the specific portion 'P' of the document D, and removes the background brightness the document D has by the image processing. Here, the specific portion 'P' is statistically set, which corresponds to a background image of a document in general.

More detailed descriptions will be provided as follows.

The photoelectric conversion part 261 outputs an image of the specific portion 'P' in voltages of the pixel patterns, the A/D conversion part 263 converts the voltages of the pixel patterns into digital data, and outputs the converted digital data corresponding to the read-out image (operation S711)

The image data of the specific portion 'P' is compensated for with white/black shading corrections in the shading correction part 265, and then the contrast for the image data of the specific portion 'P' is compensated based on a default contrast equalization pattern in the contrast compensation part 267 (operation S713).

The image data of the specific portion 'P' for which the shading and the contrast is compensated is stored in the storage part 269 (operation S715). The image data stored in the storage part 269 is digital data having predetermined bits per pixel.

The control part 280 analyzes the image data of the specific portion stored in the storage part 269, predicts the background brightness level of the document D (operation S717), and decides whether to remove the background brightness of the document D.

Diverse methods of deciding whether to remove the background brightness can be implemented based on system designs. For example, provided that image data stored in the storage part 269 is 8-bit image data having 0~255 gradient levels and the brightness level as to image data of the specific portion 'P' exists between an upper threshold value and a lower threshold value, the document D is decided to have a certain background brightness.

If the background brightness of the document D has to be removed as a result of the decision (operation S719), the control part 280 controls the contrast compensation part 267 to apply a contrast equalization pattern suitable for the document D out of plural contrast equalization patterns such as gamma characteristic curves predetermined in the lookup table 267-1 based on the predicted background brightness level (operation S721).

In the meantime, if it is decided that the predicted background brightness level does not have to be removed, the control part 280 controls the contrast compensation part 267 to apply the normal contrast equalization pattern predetermined in the lookup table 267-1 (operation S723).

Thereafter, as aforementioned, the image is processed from the position 'B', that is, the front end of the document D (operation S725). That is, an inherent background brightness of the document D is automatically removed by the contrast compensation part 267 having an adaptively selected contrast equalization pattern.

Accordingly, the present general inventive concept can provide an image-forming apparatus capable of performing an Automatic Background Removal function in the automatic document feeder mode.

The present general inventive concept can adjust the movements of the carriage and a document to perform the Automatic Background Removal function in the automatic document feeder mode to read out the image of the document with the document moving while the light source is fixed.

Furthermore, the present general inventive concept can adjust a decision standard to select a contrast equalization pattern depending upon a brightness level of a specific portion of a document, to thereby not only perform an Automatic Background Removal function, but also improve print quality of an output.

Furthermore, the present general inventive concept can prevent waste of unnecessary consumables.

Although the preferred embodiments of the present general inventive concept have been described, it will be understood by those skilled in the art that the present general inventive concept should not be limited to the described preferred embodiments, but various changes and modifications can be made within the spirit and scope of the present invention as defined by the appended claims.

What is claimed is:

1. An image-forming apparatus having an automatic document feeder (ADF) mode, comprising;

a first movement means for moving a document loaded on a document tray from a first position to a second position;

a second movement means for moving a carriage containing a light source from the first position to the second position;

an image processing means for processing an image of the document into predetermined image data;

a control part to control the image processing means to process an image of a specific portion of the document read out by the carriage fixed at the first position and to process an entire image of the document read out by the carriage fixed at the second position using a predetermined contrast equalization pattern selected based on an image processing result of the specific portion; and when the most suitable contrast equalization pattern is applied to the image processing means, the control part controls the second movement means to move the carriage to the second position, and controls the first movement means to restart the movement of the document.

2. The image-forming apparatus as claimed in claim 1, wherein the specific portion is a certain portion corresponding to a portion from a certain position, at which the front end of the document arrives passing the first position, to the second position at which the front end of the document arrives.

3. The image-forming apparatus as claimed in claim 1, wherein, when the front end of the document arrives at the second position, the control part controls the first movement means to temporarily stop the movements of the document, and controls the image processing means to process an image of the specific portion read out by carriage at the first position and to select and apply the most suitable contrast equalization pattern to the document.

4. The image-forming apparatus as claimed in claim 1, wherein the front end of the document temporarily stops at the second position, and then the frontend of the document is read out by the carriage fixed at the second position, so that the image processing means processes an image from the front end of the document using the most suitable contrast equalization pattern.

5. The image-forming apparatus as claimed in claim 1, wherein the image processing means includes:

a photoelectric conversion means for converting light reflected and inputted from the document into an electric signal;

an analog-to-digital (A/D) conversion means for converting the electric signal into image data of digital format;

a contrast compensation means for compensating contrast for the image data applying a predetermined contrast equalization pattern; and a storage means for storing the contrast-compensated image data, the control part analyzing the image data of the specific portion stored in the storage means and then applying the most suitable contrast equalization pattern to the contrast compensation means, and the contrast compensation means compensating for the entire image of the document using the most suitable contrast equalization pattern.

6. The image-forming apparatus as claimed in claim 5, wherein the contrast compensation means includes a lookup table in which plural predetermined contrast equalization patterns are provided, and the control part analyzes the image data of the specific portion and selects the most suitable contrast equalization pattern out of the plural contrast equalization patterns provided in the lookup table.

7. The image-forming apparatus as claimed in claim 1, wherein the contrast equalization pattern is a gamma characteristic curve.

8. A method of controlling operations of an automatic document feeder mode in an image-forming apparatus, the method comprising:

processing an image of a specific portion of a document read out by a carriage containing a light source and fixed at a first position;

selecting a suitable contrast equalization pattern based on an image processing result of the specific portion;

moving the carriage to a second position if the suitable contrast equalization pattern is applied;

restarting the movements of the document whose front end arrives at the second position; and processing an entire image of the document read out by the carriage fixed at the second position using the suitable contrast equalization pattern.

9. The method as claimed in claim 8, wherein the specific portion is a certain portion corresponding to a portion from a certain position, at which the front end of the document arrives passing the first position, to the second position at which the front end of the document arrives.

10. The method as claimed in claim 8, wherein the operation of processing an image of a specific portion of a document read out by a carriage is performed after the operation of temporarily stopping movements of the document when the front end of the document arrives at the second position.

11. The method as claimed in claim 8, wherein the operation of processing an entire image of the document read out by a carriage processes the image of the document read out of the front end of the document by the carriage fixed at the second position in use of the suitable contrast equalization pattern.

12. The method as claimed in claim 8, wherein the contrast equalization pattern is a gamma characteristic curve.

13. An image-forming apparatus having an automatic document feeder (ADF) mode, the apparatus comprising:

a motor to move a document loaded on a document tray in an advancing direction and a withdrawing direction;

a carriage having a light source to read out an image of the document, and fixed at a predetermined position;

an image processing part to process the image of the document into predetermined image data; and a control part to control the motor to move the document in the advancing direction while controlling the image processing part to process an image of a specific portion of the document, and to move the document in the withdrawing direction to move a front end of the document to the predetermined position of the carriage, the control part to control the motor to move the document arrived at the position of the carriage in the advancing direction while controlling the image processing part to process the image of the document from the front end of the document based on the image processing result.

14. The image-forming apparatus as claimed in claim 13, wherein, when an image of the specific portion of the document is read-out in use of the carriage, the control part controls the motor to temporarily stop the advancing movement of the document, while controlling the image processing part to process the image of the specific portion, and select and apply the most suitable contrast equalization pattern to the document.

15. The image-forming apparatus as claimed in claim 13, wherein the image processing part includes:

a photoelectric conversion part to convert light reflected and inputted from the document into an electric signal;

an analog-to-digital (A/D) conversion part to convert the electric signal into image data of digital format;

a contrast compensation part to compensate contrast for the image data applying a predetermined contrast equalization pattern; and a storage part to store the contrast-compensated image data, the control part analyzing the image data of the specific portion stored in the storage part and then applying the most suitable contrast equalization pattern to the contrast compensation part, and the contrast compensation part compensating for an entire image of the document from the front end in use of the most suitable contrast equalization pattern.

16. The image-forming apparatus as claimed in claim 15, wherein the contrast compensation part includes a lookup table in which plural predetermined contrast equalization patterns are provided, and the control part analyzes the image data of the specific portion and selects the most suitable contrast equalization pattern out of the plural contrast equalization patterns provided in the lookup table.

17. The image-forming apparatus as claimed in claim 13, wherein the contrast equalization pattern is a gamma characteristic curve.

18. A method of controlling operations of an automatic document feeder mode in an image-forming apparatus, comprising:

moving a document loaded on a document tray in an advancing direction to read out an image of a specific portion of the document;

selecting and applying a suitable contrast equalization pattern based on the result of the read out of the image of the specific portion;

moving the document in a withdrawing direction and moving a carriage having a light source to read out the image of the document to a fixed position; and moving the document in the advancing direction and processing the image from a front end of the document corresponding to the suitable contrast equalization pattern.

19. The method as claimed in claim 18, wherein the operation of moving a document loaded on a document tray in an advancing direction to read out an image of a specific portion of the document includes an operation of temporarily stopping the advancing movements of the document when the image of the specific portion of the document is read out.

20. The method as claimed in claim 18, wherein, if plural documents are loaded on the document tray, each of the operations are repeated with respect to a next document.

21. The method as claimed in claim 18, wherein the contrast equalization pattern is a gamma characteristic curve.

22. An image-forming apparatus having an automatic document feeder (ADF) mode, comprising:

a first movement unit to move a document loaded on a document tray from a first position to a second position;

a second movement unit to move a carriage containing a light source from the first position to the second position;

an image processing part to process an image of the document into predetermined image data; and a control part to control the image processing part to process an image of a specific portion of the document read out by the carriage fixed at the first position and to process an entire image of the document read out by the carriage fixed at the second position using a predetermined contrast equalization pattern selected based on an image processing result of the specific portion.

23. The image-forming apparatus as claimed in claim 22, wherein the specific portion is a certain portion corresponding to a portion from a certain position, at which the front end of the document arrives passing the first position, to the second position at which the front end of the document arrives.

24. The image-forming apparatus as claimed in claim 22, wherein, when the front end of the document arrives at the second position, the control part controls the first movement unit to temporarily stop the movements of the document, and controls the image processing part to process an image of the specific portion read out by the carriage at the first position and to select and apply the most suitable contrast equalization pattern to the document.

25. The image-forming apparatus as claimed in claim 22, wherein, when the most suitable contrast equalization pattern is applied to the image processing part, the control part controls the second movement unit to move the carriage to the second position, and controls the first movement unit to restart the movement of the document.

26. The image-forming apparatus as claimed in claim 25, wherein the front end of the document temporarily stops at the second position, and then the front end of the document is read out by the carriage fixed at the second position, so that the image processing part processes an image using the most suitable contrast equalization pattern from the front end of the document.

27. The image-forming apparatus as claimed in claim 22, wherein the image processing part includes:

a photoelectric conversion part to convert light reflected and inputted from the document into an electric signal;

an analog-to-digital (A/D) conversion part to convert the electric signal into image data of digital format;

a contrast compensation part to compensate contrast for the image data applying a predetermined contrast equalization pattern; and a storage part to store the contrast-compensated image data, the control part analyzing the image data of the specific portion stored in the storage part and then applying the most suitable contrast equalization pattern to the contrast compensation part, and the contrast compensation part compensating for the entire image of the document in use of the most suitable contrast equalization pattern.

28. The image-forming apparatus as claimed in claim 27, wherein the contrast compensation part includes a lookup table in which plural predetermined contrast equalization patterns are provided, and the control part analyzes the image data of the specific portion and selects the most suitable contrast equalization pattern out of the plural contrast equalization patterns provided in the lookup table.

29. The image-forming apparatus as claimed in claim 22, wherein the contrast equalization pattern is a gamma characteristic curve.

30. An image-forming apparatus having an automatic document feeder (ADF) mode, comprising:

a first movement unit to move a document loaded on a document tray from a first position to a second position;

a second movement unit to move a carriage from the first position to the second position;

an image processing part to process an image of the document into predetermined image data; and a control part to control the image processing part to process an image of a specific portion of the document read out by the carriage fixed at the first position and to process an entire image of the document read out by the carriage fixed at the second position using a predetermined contrast equalization pattern selected based on an image processing result of the specific portion.

* * * * *

UNITED STATES PATENT AND TRADEMARK OFFICE

CERTIFICATE OF CORRECTION

PATENT NO. : 7,663,786 B2
APPLICATION NO. : 10/933313
DATED : February 16, 2010
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1566 days.

Signed and Sealed this

Twenty-eighth Day of December, 2010

David J. Kappos

*Director of the United States Patent and Trademark Office*